United States Patent [19]

Magnenet

[11] 4,004,505
[45] Jan. 25, 1977

[54] ELECTROMAGNETIC STRIKER MECHANISM FOR A PRINTER

[75] Inventor: Jean Georges Magnenet, Belfort, France

[73] Assignee: Compagnie Honeywell Bull (Societe Anonyme), Paris, France

[22] Filed: Nov. 5, 1974

[21] Appl. No.: 521,023

[30] Foreign Application Priority Data
Nov. 6, 1973 France .............................. 73.39409

[52] U.S. Cl. ............................. 101/93.48; 335/229
[51] Int. Cl.² ............................................. B41J 9/02
[58] Field of Search ........... 101/93.28, 93.29, 93.3, 101/93.48, 93.02; 335/276, 279, 229

[56] References Cited
UNITED STATES PATENTS

| | | | |
|---|---|---|---|
| 3,279,362 | 10/1966 | Helms | 101/109 X |
| 3,335,659 | 8/1967 | Schacht et al. | 101/93.02 |
| 3,351,006 | 11/1967 | Belson | 101/93.02 |
| 3,477,365 | 11/1969 | Nyman | 101/93.48 X |
| 3,543,906 | 12/1970 | Hladky | 101/93.29 X |
| 3,705,370 | 12/1972 | Chai et al. | 335/229 |
| 3,780,650 | 12/1973 | Meier | 101/93.48 |

Primary Examiner—Edward M. Coven
Attorney, Agent, or Firm—Cameron, Kerkam, Sutton, Stowell & Stowell

[57] ABSTRACT

An electromagnetic striker apparatus. The apparatus includes a core member, a coil associated with the core member and an armature member. The apparatus also includes means for guiding the armature member in movement relative to the core member. In response to actuation of the coil, the armature moves from a rest position to a strike position, whereby a character key is driven against a print support. Under the influence of the guiding means, the armature moves substantially parallel to the magnetic flux lines within the armature.

12 Claims, 14 Drawing Figures

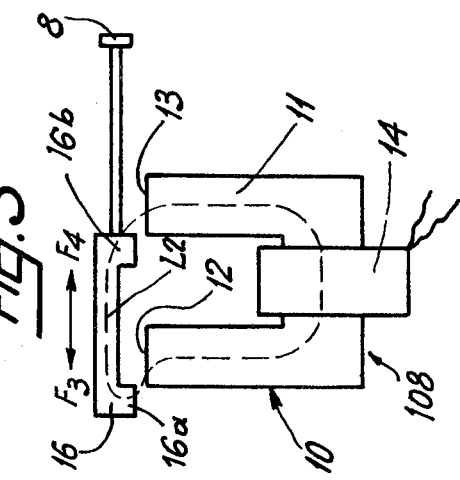
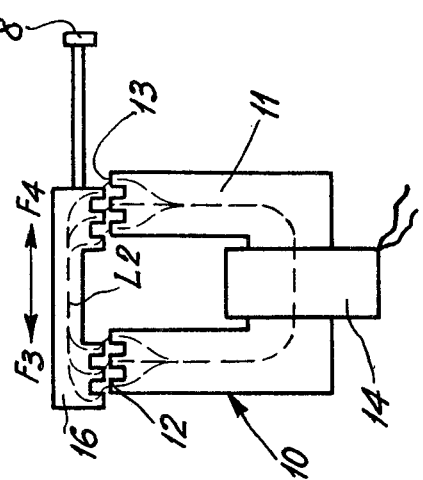
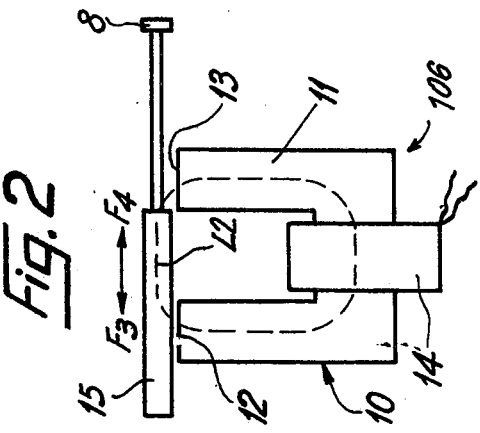
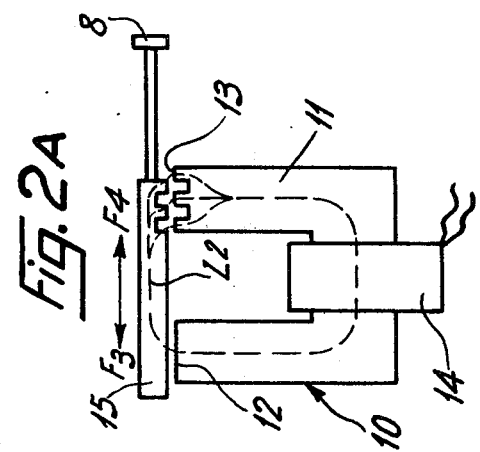
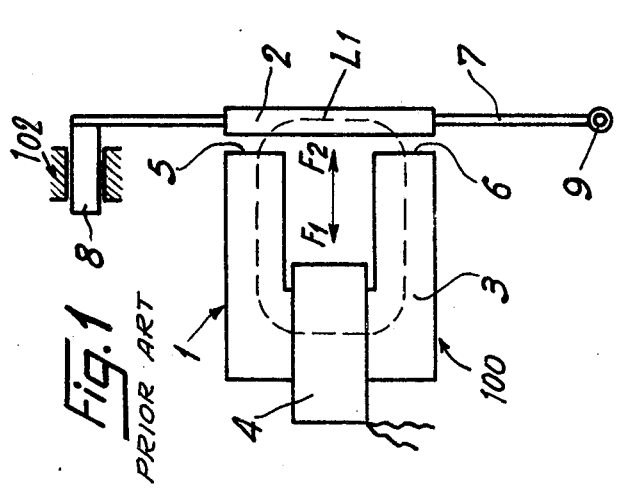
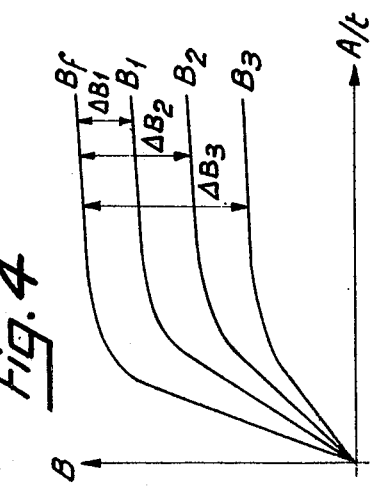

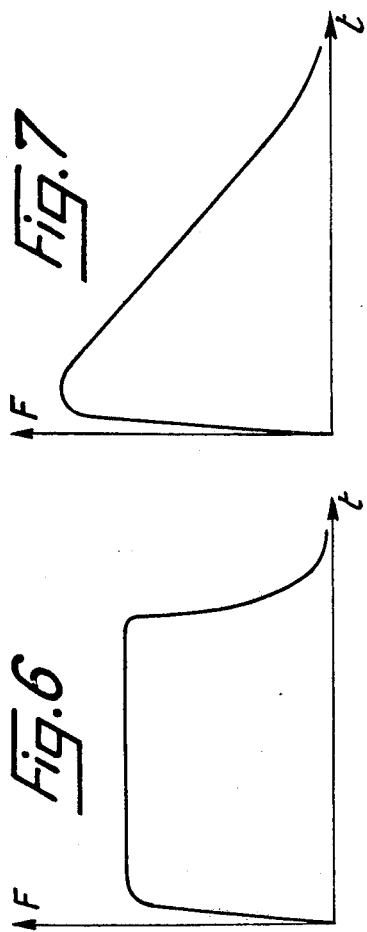
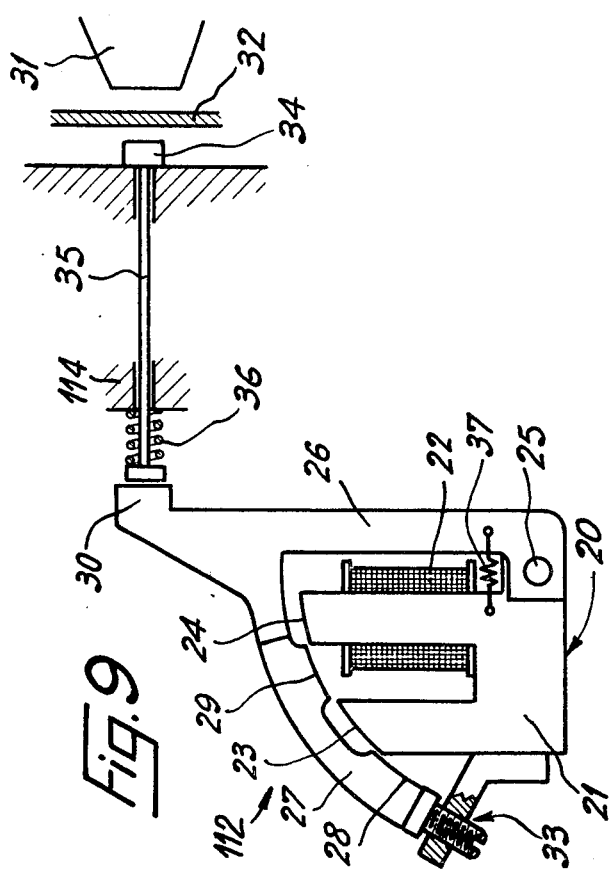
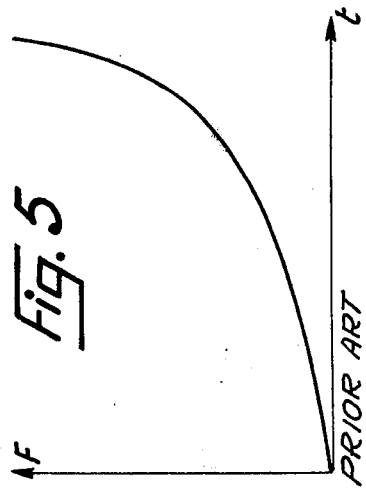
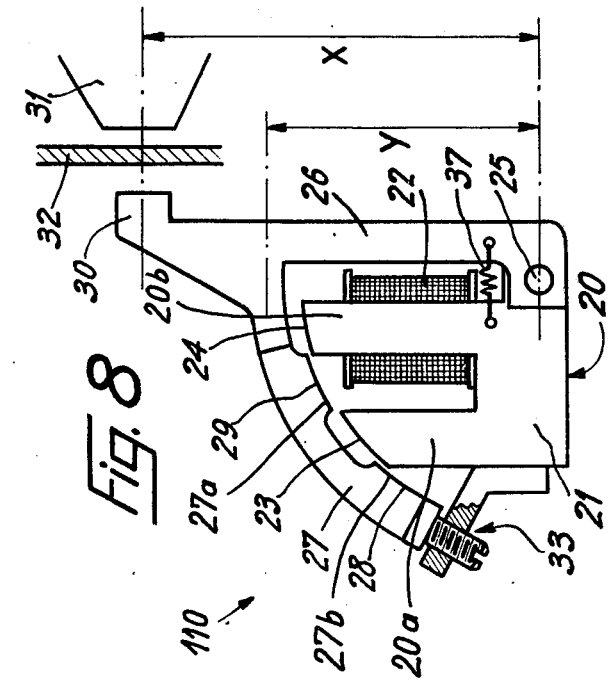

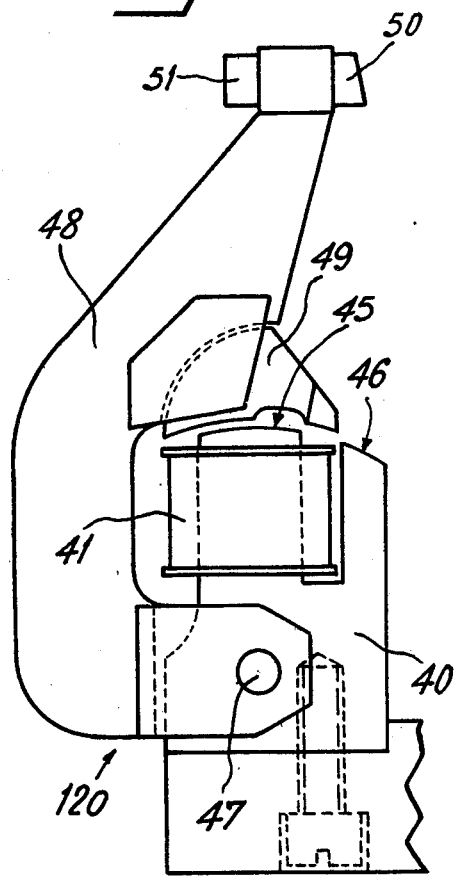
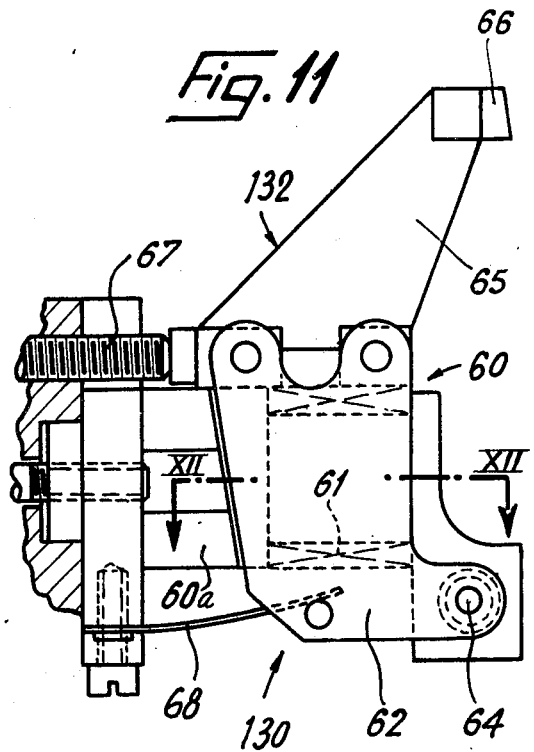
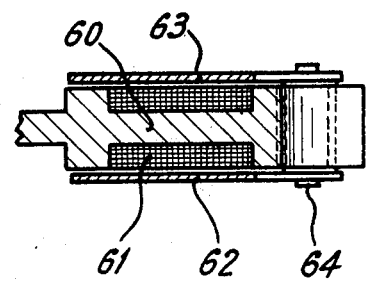

ELECTROMAGNETIC STRIKER MECHANISM FOR A PRINTER

BACKGROUND OF THE INVENTION

The present invention relates generally to a printer, such as a computer printer, and more particularly to an apparatus for electromagnetically operating the character keys of a printer.

In the presently known printers, the various characters are struck by actuation of adjacent striker mechanisms. Each mechanism operates a hammer which drives the key against a print support.

One electromagnetic striker apparatus includes an inductor or core member, forming a horseshoe-shaped magnetic circuit, an electromagnetic coil mounted on the core member and a magnetic strip armature. The armature, which substantially aligns with the free ends or pole pieces of the core member pivots about an axis perpendicular to the plane of the horseshoe-shaped core member. When the coil is excited by a current, the armature moves towards, or away from, the core member and thereby operates the strike hammer. It will be noted that, in this particular arrangement, the armature moves substantially perpendicularly to the lines of magnetic flux which pass through the armature.

As discussed in detail below, the presently known striker apparatus have numerous and significant shortcomings.

In particular, the propulsive force exerted on the armature at the moment the actuating current begins to flow in the coil is relatively weak. As a result, the flight time of the strike hammer, i.e., the time necessary to effect printing of a character, varies considerably. This variance exists between different striker mechanisms and strokes of the same mechanism. The magnitude of the variance depends upon frictional forces between fixed and moving parts of the apparatus.

The striking action obtained with the presently known electromagnetic striker mechanisms is, therefore, poor in quality and restricted in speed. That is, the variation in flight times causes character misalignment on the print support. Further, the mechanical inefficiency of the known apparatus substantially restricts the speed of operation of the hammer.

SUMMARY OF THE PRESENT INVENTION

In a principal aspect, the present invention is an apparatus for electromagnetically operating the character keys of a printer. The apparatus includes a core member, having a coil which is excitable by an actuating current, and an armature member movable relative to the core member between a rest position and a strike position under the influence of the actuating current. The core member and armature cooperatively define a magnetic circuit and excitation of the coil produces a flux in the magnetic circuit. The apparatus also includes means for guiding the armature member, whereby the armature member moves substantially parallel to the flux lines passing through and within the armature member.

In the rest position, the reluctance of the magnetic circuit formed by the core and armature members causes, with excitation, movement of the armature relative to the core member. The movement of the armature decreases the reluctance. A propulsive force is, therefore, exerted upon the armature member as soon as the actuating current beings to flow in the coil.

In a first embodiment of the present invention, the core includes two substantially parallel arms. The ends of the arms are provided with pole pieces to define a substantially U-shaped or horseshoe magnetic circuit. The armature moves across and substantially parallel to the pole pieces.

In this embodiment, the armature is bar-shaped and its length is substantially the same as the distance separating the pole pieces. The armature is laterally displaced with respect to the arms of the core member in the rest position and substantially centralized with respect thereto in the strike position.

Alternatively, the armature is substantially U-shaped having two projections extending substantially towards the pole pieces of the core member. The distance between the projections substantially corresponds to the distance between the arms of the core. Again, the armature is laterally displaced relative to the core member in the rest position and substantially centralized in the strike position, i.e., the arms of the core member and projections of the armature member are substantially opposite one another in the strike position.

In the first embodiment, the pole pieces of the core member are substantially flat and coplanar. The guiding means permits substantially translatory motion of the armature member in a plane substantially parallel to the plane defined by the pole pieces.

In a further preferred embodiment, the pole pieces of the core member are curved and substantially align with portions of a cylinder having an axis. The guiding means include means for rotating the armature member about the cylinder axis, e.g., a pivot shaft or pin. Preferably, the distance between the axis and armature member is large with respect to the distance moved by the armature between the rest and strike positions.

The armature in this embodiment, is also a uniform bar. However, the surface facing the core member is curved and substantially parallel to the plane of the pole pieces, i.e., the surface of the previously described cylinder.

Alternatively, the armature is substantially U-shaped having a pair of projections directed towards the core. The ends of the projections are parallel to the pole pieces.

In another preferred embodiment, the armature consists of two mutually parallel magnetic side-pieces which are substantially parallel to the axis of the coil and arranged on opposite sides thereof. The side-pieces are hinged about a common pivot axis which is perpendicular to the axis of the coil. The distance between the pivot axis and the center of the coil is large in comparison with the range of movement of the side-pieces. The side-pieces cooperatively define a rotatable fitting, which includes a strike hammer.

Resiliant return means, such as a spring, may be employed to urge the armature or the rotatable fitting, towards the rest position. Similarly, adjustable stops may be employed to adjust the initial or rest position of the armature member.

It is thus an object of the present invention to provide an electromagnetic striker apparatus which substantially avoids the problems and shortcomings of the presently known striker mechanisms.

It is also an object of the present invention to provide an electromagnetic striker mechanism wherein an armature moves, in response to an actuating current, substantially parallel to the lines of flux through the armature, whereby the mechanical efficiency of the mechanism is substantially improved.

It is a further object of the present invention to provide an electromagnetic striker apparatus wherein the reluctance of the magnetic circuit, defined by a core member and an armature, is greatest with the armature in the rest or initial position, as opposed to the strike position, whereby a propulsive form operates upon the armature at the moment an actuating current begins to flow.

It is another object of the present invention to provide an electromagnetic striker apparatus wherein strike or flight times are substantially uniform and constant.

It is also an object of the present invention to provide an improved electromagnetic striker apparatus for a printer which is readily and inexpensively manufactured and maintained.

These and other objects, features and advantages of the present invention will become apparent in the following detailed description of a preferred embodiment.

BRIEF DESCRIPTION OF THE DRAWING

A preferred embodiment of the present invention will be described, in detail, with reference to the drawing, wherein:

FIG. 1 is a schematic diagram of a presently known electromagnetic striker apparatus;

FIG. 2 is a schematic diagram illustrating a first preferred embodiment of the present invention;

FIG. 2A is a schematic diagram illustrating a modification of the preferred embodiment shown in FIG. 2;

FIG. 3 is a schematic diagram illustrating a second preferred embodiment of the present invention;

FIG. 3A is a schematic diagram illustrating a modification of the preferred embodiment shown in FIG. 3;

FIG. 4 is a graph illustrating the magnetic flux in the magnetic circuit of a core member and armature as a function of ampere-turns of an actuating coil;

FIGS. 5, 6 and 7 are graphs illustrating the force exerted on the armature of the electromagnetic strike apparatus shown in FIGS. 1, 2 and 3 respectively, as a function of time;

FIG. 8 is a side plan view of a third preferred embodiment of the present invention;

FIG. 9 is a side plan view illustrating a modification of the device in FIG. 8;

FIG. 10 is a side plan view of another preferred embodiment of the present invention;

FIG. 11 is a side plan view of still another preferred embodiment of the present invention; and FIG. 12 is a partial cross-sectional view of the preferred embodiment shown in FIG. 11 taken along 12—12.

DETAILED DESCRIPTION OF A PREFERRED EMBODIMENT

A presently known electromagnetic striker apparatus is shown schematically in FIG. 1 and generally designated 100. The apparatus 100 includes an electromagnet 1 which comprises a strip-shaped armature 2 and a core or inductor member 3. The core member 3 is substantially U-shaped and includes a coil 4 and two pole pieces 5, 6. As shown, the coil 4 is wound about the central portion of the U-shaped core member 3.

The armature 2 substantially aligns with the plane of the pole pieces 5, 6. The armature 2 is attached to a rod 7. A strikehammer 8 is secured to one end of the rod 7 and slideably engages a guide 102. The other end of rod 7 is pivotally connected to a shaft 9 which is substantially perpendicular to the plane of the U-shaped core 3.

Under the forces created by a current flowing through the coil 4 and a return spring (not shown), the armature 2 moves in the directions shown by arrows $F_1$ and $F_2$, respectively. The movements are substantially translatory, i.e., towards and away from the pole pieces 5, 6. Thus, the movements of the armature 2 are substantially perpendicular to the lines of flux of the magnetic field passing through the armature 2. The lines of flux within the armature 2 are designated "L1" in FIG. 1.

The striker apparatus 100 has numerous shortcomings. It is readily apparent that the armature 2 can strike against and damage the pole pieces 5, 6.

Referring to FIG. 5 which shows the change in the force F exerted on the armature 2 as a function of elapsed time $t$ after the actuating current begins to flow in coil 4, it is clear that the force is initially very weak. As a result, movement of the armature 2 is particularly dependent upon the coefficient of friction between parts. However, the coefficient varies substantially and continuously. The variations are inversely proportional to the range of movement of the armature 2. Thus, the flight or strike time of the apparatus 100 varies substantially. And, the flight times of the strikers operating cooperatively in a printer are also non-uniform.

Further, the force F exerted by the apparatus 100 on the armature 2 is greatest at the moment the magnetic circuit, defined by the armature 2 and core 3, closes. The mechanical efficiency of the apparatus 100 is, therefore, low. This is shown in FIG. 4 wherein the magnetic flux B flowing in magnetic circuit of armature 2 and core 3 is plotted as a function of the ampere-turns of the coil 4. It is known that the mechanical efficiency of the appparatus 100 is proportional to the difference in magnetic flux between the initial and final positions of the armature 2. When the armature 2 is in a rest position, i.e., remote from the pole pieces 5, 6, the magnetic flux in circuit is represented by curve $B_1$. The curve $B_f$ represents the flux in the magnetic circuit after closing, i.e., with the armature 2 in the strike position.

The mechanical energy imparted to hammer 8 is thus proportional to the difference $B_1 = B_f - B_1$. The magnetic flux $B_f$, which corresponds to the saturation flux, is a constant of the magnetic circuit of armature 2 and core 3 and therefore cannot be increased. Conversely, for the apparatus 100 shown in FIG. 1, $B_1$ cannot be reduced below a value of approximately ¾$B_f$. As a result $B_1$ is at best equal to $B_f/4$, representing a relatively low mechanical efficiency.

Additionally, when the magnetic circuit closes, the kinetic energy of armature 2 must be absorb. Although a portion can be absorbed by a residual magnetisation suppressor (not shown), the remainder is transmitted to the fixed components of the apparatus 100 and adjacent striker mechanisms, which gives rise to additional inconsistencies in the response times.

The apparatus 100 shown in FIG. 1 is also very sensitive to alterations in geometry. Thus, it must be precision-machined, which substantially increases production and maintenance costs.

A first and second preferred embodiment of the present invention are shown schematically in FIGS. 2 and 3 and generally designated as electromagnetic striker apparatus 106, 108, respectively. Similar components are similarly designated in FIGS. 2, 2A, 3 and 3A.

The apparatus 106, 108 include an electromagnet 10 comprising a U-shaped core member 11, pole pieces 12, 13, a coil 14 mounted on the core 11 and armatures 15, 16, respectively. A strike hammer 8 is secured to the armatures 15, 16.

The armatures 15, 16 are guided and move in translation substantially parallel to pole pieces 12, 13 as shown by arrows $F_3$, $F_4$. Thus, the armatures 15, 16 move substantially parallel to the flux lines L2 which pass through armatures 15, 16.

In the rest position, the armatures 15, 16 are laterally displaced with respect to the pole pieces 12, 13, such that the reluctance of the magnetic circuit, which varies with the position of the armatures 15, 16 relative to the pole pieces 12, 13 is increased to a predetermined value. Consequently, a propulsive force is exerted on the armatures 15, 16 at substantially the moment an actuating current begins to flow in the coil 14. FIGS. 6 and 7 show the force F on the armatures 15, 16, respectively, as a function of elapsed time t after actuation. The difference in force is attributable to the configurations of armatures 15, 16, as discussed below.

In contrast, the force exerted on the armature 2 of apparatus 100, as shown in FIG. 5, builds with time of actuation. The response of the armature 2 is, therefore, sluggish in comparison with the response of the armatures 15, 16. In other words, the apparatus 106, 108 have substantially reduced response or strike times relative to the presently known striker apparatus 100.

The armature 15 is a simple magnetic bar. The length of the armature 15 is substantially the same as the width of core member 11. In the starting or rest position (shown in FIG. 2), the armature 15 is misaligned or displaced with respect to the core 11, and in the striking position, the armature 15 is substantially centralized. That is, the ends of the armature 15 are substantially opposite the pole pieces 12, 13 respectively. The armature 15 moves from the rest position to the strike position in response to an actuating current flowing in the coil 14 and conversely, from the strike position to the rest position under the influence of a return spring (not shown).

The armature 16 is substantially U-shaped and includes a pair of projections 16a, 16b, which extend substantially towards the core 11. In the starting or rest position (shown in FIG. 3), the armature 16 is displaced from the core member, and in the strike position, the projections 16a, 16b substantially align with the pole pieces 12, 13. The armature 16 is also urged towards the rest position by a return spring (not shown).

Referring again to FIG. 4, the magnetic flux developed in the striker apparatus 106, 108 in the rest state is shown by curves $B_2$ and $B_3$, respectively. As shown, the curves $B_2$ and $B_3$ are substantially below the curve $B_1$ for the apparatus 100. Quantitively, $B_2$ is approximately $0.6B_f$ and $B_3$ is approximately $0.4B_f$. Thus, the mechanical efficiencies of the apparatus 106, 108 (which are proportional to $\Delta B_2 = B_f - B_2$ and $\Delta B_3 = B_f - B_3$, respectively approximately) are respectively two and two and a half times that of the known apparatus 100.

In brief summary, the apparatus 106, 108 substantially avoid the non-uniformity of flight times experienced in the presently known striker apparatus, e.g., apparatus 100. Further, the apparatus 106, 108 substantially reduce and shorten the flight times of the hammer 8. The flight time of the apparatus 108 is approximately one-third that of the apparatus 100, for similar power levels and strokes.

Further, the disclosed preferred embodiments of the present invention are simple, inexpensive constructions with high reliability. Since the, core 11 is not subject to the impacts from the armature 15, 16, materials best suited for the striker apparatus 106, 108 can be used without regard to limitations due to mechanical stresses. The force of the strike is adjustable by regulation of actuating current intensity or length of actuation time. Additionally, a pulse may be applied to the coil 14 while the armatures 15, 16 are returning to the rest position to shorten the settling time of the armatures 15, 16 and to reduce mechanical strains on the armature stop.

FIGS. 2A and 3A show modifications of the striker apparatus 106, 108 respectively. As shown, the core 11 and armatures 15, 16 are appropriately notched to produce a multipolar core and armature. This multipolar form permits the movement of the armatures 15, 16 to be adjusted for a given striking force.

Referring to FIG. 8, another preferred embodiment of the present invention is shown and generally designated as a striker apparatus 110. The apparatus 110 includes a core or inductor member 20, defining a substantially U-shaped magnetic circuit 21, and a coil 22. The core member 20 includes two substantially parallel arms 20a, 20b, ending in pole pieces 23, 24, respectively. The coil 22 is mounted on the arm 20b.

The pole pieces 23, 24 are curved and substantially parallel with the surface of an imaginary cylinder having a center or axis at the pivot shaft 25. The shaft 25 is attached to the core 20. A movable, rotatable fitting 26 is pivotally connected to the shaft 25. A tension spring 37 is connected between the movable fitting 26 and the core 20.

A substantially U-shaped armature 27 having projections 27a, 27b is secured to the fitting 26. The armature 27 and armature 16, shown in FIG. 3, are similar except that the ends of the projections 27a, 27b are curved and substantially align with portions of the previously described imaginary cylinder. Thus, the ends or faces of projections 27a, 27b are substantially parallel to the plane defined by pole pieces 23, 24.

For purposes of this disclosure, the term "parallel" is defined with reference to both flat and curved planes. Thus, under this definition, similarly curved surfaces define parallel planes and a rotating curved surface moves parallel to the plane of a similarly curved surface.

The shaft 25 is eccentric with respect to the armature 27. The distance between the shaft 25 and armature 27 is large in comparison with the range of rotational movement of the movable fitting 26.

A strike hammer 30 is also secured to the movable fitting 26. In conjunction with a backing support 31, the strike hammer 30 prints characters on a print support 32.

The initial or rest position of the movable fitting 26 which is depicted in FIG. 8, is determined by an adjustable stop 33 mounted on the core 20. In this position, the armature 27 is laterally displaced with respect to the pole pieces 23, 24 of the core 20. Thus, when an actuating current of suitable polarity is applied to coil 22, the movable fitting 26 rotates about shaft 25 due to the fact that the armature 27 responds to the actuation to reduce the reluctance of magnetic circuit.

The actuating current is applied until the movable fitting 26 reaches the desired speed. At that point, actuation is discontinued and the fitting 26 continues in free flight until the hammer 30 drives the print support 32 against the support 31. After striking, the movable fitting 26 returns, under the action of spring 37, to its initial position against stop 33. The stop 33 absorbs and deadens the shock of the fitting return.

By appropriate dimensioning of the movable fitting 26, and particularly dimensions X and Y shown in FIG. 8, the striking mass may be adjusted to achieve a desired impact time. As a result, the striker mechanism 110 can be used in all types of printers. In effect, if Y is large in comparison with X, the striking mass is low, whereas if Y is substantially the same as or less than X, the striking mass is high.

Referring now to FIG. 9, a modification of the apparatus 110 is shown and designated as striker 112. The striker 112 operates upon and transmits its velocity to a strike hammer 34 of the required mass. The strike hammer 34 is mounted on one end of a sliding rod 35 which fits within a guide 114. The rod 35 is subject to the action of a return spring 36, as shown. In operation, the hammer 30 strikes the end of the rod 35 and thereby drives the hammer 34 against the support 31.

In the apparatus 112, the actuating current is applied until the movable fitting 26 reaches at least the minimum reluctance portion. At that point, the fitting 26 begins its return, while the hammer 34 continues on its way to impact.

FIG. 10 shows a striker apparatus 120 representing another preferred embodiment of the present invention. The apparatus 120 includes a substantially U-shaped magnetic circuit former or core 40 and a coil 41 mounted on one arm thereof. The pole pieces 45, 46 substantially align with sections of the surface of an imaginary cylinder.

The core 40 also includes a pivot shaft 47. The center of the imaginary cylinder substantially aligns with the shaft 47. An aluminum yoke 48 carrying a magnetic armature 49 is pivotally connected to the shaft 47. Opposite the connection, the yoke 48 includes a strike hammer 50.

FIGS. 11 and 12 show still another preferred embodiment of the present invention. This striker mechanism 130 includes a core, generally designated 60, having a magnetic circuit arm 60a and a coil 61 wound thereon. A pair of substantially parallel magnetic side-pieces 62, 63 are pivotally connected to a shaft 64 which is substantially perpendicular to the axis of the coil 61. As shown in FIG. 12, the side-pieces 62, 63 substantially enclose the coil 61 on two sides.

The magnetic side-pieces 62, 63 are secured to a non-magnetic arm 65. The arm 65 carries a strike hammer 66 and cooperates with an adjustable stop 67 to define the rest position of a movable fitting, generally designated 132, cooperatively defined by side-pieces 62, 63 and arm 65. In the rest position, the side-pieces 62, 63 are displaced with respect to coil 61 such that the reluctance of the total magnetic circuit exceeds the minimum possible reluctance. Thus, in response to application of an actuating current to the coil 61, side-pieces 62, 63 rotate about shaft 64. The rotational planes of the side-pieces 62, 63 are substantially parallel to the lines of flux in the side-pieces 62, 63. The distance between pivot shaft 64 and the center of coil 61 is large in comparison with the range of movement of side-pieces 62 and 63. A resilient strip 68 urges the movable fitting 132 towards the rest position when the actuating current ceases.

Although several preferred embodiments of the present invention have been herein disclosed, the true scope and spirit of the present invention is set forth and defined by the following claims alone.

What is claimed is:

1. An electromagnetic striker apparatus for a printer having a type carrier movable before a print support for effecting a print out of the character upon excitation of the striker comprising, in combination:

a magnetic circuit including, magnetic core means having an electrically excitable coil supported thereon and spaced apart pole pieces having pole faces disposed in a first plane, an armature member supported on said core and having a surface disposed in a second plane parallel to said first plane, a hammer affixed to said armature member, and an air gap of constant dimension being defined between the first plane and the second plane, said armature being disposed adjacent said spaced apart pole faces, said armature member being movable with said surface remaining in said second plane from a rest position to a strike position upon excitation of said coil whereby said hammer is caused to strike the type carrier which, in turn engages the print support in response to said armature in said strike position, means for biasing said armature member in the rest position upon removal of excitation from said coil, said magnetic circuit having a first predetermined reluctance in said rest position and a second predetermined reluctance less than said first predetermined reluctance in said strike position, whereby upon movement of said armature member from said rest position to said strike position the reluctance of said magnetic circuit is substantially reduced whenever said coil is excited without changing the dimension of the air gaps defined by said planes.

2. An electromagnetic striker apparatus as claimed in claim 1 wherein said magnetic core means includes at least two arms having ends, said ends substantially defining said pole faces, and said electromagnetic striker apparatus further including guide means permitting movement of said armature substantially parallel to said planes.

3. An electromagnetic striker apparatus as claimed in claim 2 wherein said surface of said armature member adjacent said pole faces is substantially flat, and said armature member has a length substantially equal to the distance across said two arms of said magnetic core means.

4. An electromagnetic striker apparatus as claimed in claim 2 wherein said armature member is substantially U-shaped, said armature member having a length substantially equal to the distance across said arms of said magnetic core means.

5. An electromagnetic striker apparatus as claimed in claim 2 wherein said armature member in its rest position is displaced from a centralized position with respect to said arms of said magnetic core means.

6. An electromagnetic striker apparatus as claimed in claim 2 wherein said pole faces and said armature member are curved.

7. An electromagnetic striker mechanism as claimed in claim 6 wherein said guiding means includes means for rotating said armature member in a curved plane substantially parallel to said pole faces.

8. An electromagnetic striker apparatus as claimed in claim 7 wherein said armature member includes a pair of projections extending substantially towards said magnetic core means, the distance between said projections substantially equalling the distance between said arms of said core member, said projections being displaced relative to said ends in said rest position.

9. An electromagnetic striker apparatus as claimed in claim 1 wherein said armature member includes a pair of magnetic side-pieces disposed on opposite sides of said coil.

10. An electromagnetic striker apparatus as claimed in claim 9 wherein said magnetic side-pieces are substantially parallel and substantially enclose said coil on two sides thereof.

11. An electromagnetic striker apparatus as claimed in claim 9 comprising guide means for guiding said armature, said guide means including a pivot shaft, said side-pieces being rotatably secured to said pivot shaft.

12. An electromagnetic striker apparatus as claimed in claim 11 further including a non-magnetic arm supporting said hammer on said armature member and an adjustable stop cooperatively associated with said arm to define the rest position of the movable armature member, said side-pieces upon energization of said coil being displaced with respect to the rest position such that the reluctance of the total magnetic circuit is less than the reluctance at the rest position.

* * * * *